(12) United States Patent
Afshar et al.

(10) Patent No.: US 9,576,270 B1
(45) Date of Patent: Feb. 21, 2017

(54) SYSTEM AND RELATED METHOD FOR MANAGEMENT OF DEVICES OF A NETWORK SYSTEM VIA SOCIAL MEDIA INTERFACES

(75) Inventors: Vala Afshar, Burlington, MA (US); Leo Lam, Methuen, MA (US); Douglas Hyde, Wolfeboro, NH (US); Jamie Woodhead, Pelham, NH (US); Michael Lam, Manchester, NH (US); Richard Graham, Derry, NH (US)

(73) Assignee: Extreme Networks, Inc., San Jose, CA (US)

(*) Notice: Subject to any disclaimer, the term of this patent is extended or adjusted under 35 U.S.C. 154(b) by 501 days.

(21) Appl. No.: 13/465,576

(22) Filed: May 7, 2012

Related U.S. Application Data

(60) Provisional application No. 61/483,422, filed on May 6, 2011.

(51) Int. Cl.
| | |
|---|---|
| *G06F 13/00* | (2006.01) |
| *G06Q 10/10* | (2012.01) |
| *H04L 12/58* | (2006.01) |
| *H04L 29/06* | (2006.01) |
| *H04L 29/08* | (2006.01) |

(52) U.S. Cl.
CPC ............ *G06Q 10/10* (2013.01); *G06Q 10/107* (2013.01); *H04L 12/581* (2013.01); *H04L 12/585* (2013.01); *H04L 12/5855* (2013.01); *H04L 29/06* (2013.01); *H04L 29/06027* (2013.01); *H04L 29/08072* (2013.01)

(58) Field of Classification Search
CPC ....... G06Q 10/10; G06Q 10/107; H04L 29/06; H04L 29/08072; H04L 29/06027; H04L 12/581; H04L 12/585; H04L 12/5855
USPC ......................................... 709/204
See application file for complete search history.

(56) References Cited

U.S. PATENT DOCUMENTS

| | | | |
|---|---|---|---|
| 2011/0047229 A1* | 2/2011 | Sinha | G06F 9/543 709/206 |
| 2011/0221745 A1* | 9/2011 | Goldman et al. | 345/419 |

\* cited by examiner

*Primary Examiner* — Robert B Harrell
(74) *Attorney, Agent, or Firm* — Ropes & Gray LLP

(57) ABSTRACT

A system and related method for the exchange of information, data and instructions between one or more network administrators and one or more network infrastructure devices via one or more media exchanges. Devices are managed using a social media agent including a session agent that translates media messages into network device content and vice versa while maintaining context. Particular media interfaces may be selected for messaging dependent upon the particular message to be exchanged. Shorthand may be used to facilitate messaging through media of interest.

38 Claims, 9 Drawing Sheets

FIG. 9

SYSTEM AND RELATED METHOD FOR MANAGEMENT OF DEVICES OF A NETWORK SYSTEM VIA SOCIAL MEDIA INTERFACES

CROSS REFERENCE TO RELATED APPLICATION

The present application is a nonprovisional, and claims the priority, of U.S. provisional application Ser. No. 61/483,422, filed May 6, 2011, of the same title and owned by a common assignee. The entire content of that application is incorporated herein by reference.

BACKGROUND OF THE INVENTION

1. Field of the Invention

The present invention is a system and related method to enable the establishment of one or more functions that permit the exchange of information, data and instructions from and to one or more networks, network devices or devices real or virtual attached to a network via social media exchanges as defined herein.

2. Description of the Prior Art

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network system. For example, individuals associated with a college campus may each have a computing device. In addition, there may be shared printers and remotely located application servers sprinkled throughout the campus. There is commonality among the individuals in that they all are associated with the college in some way. The same can be said for individuals and their computing arrangements in other environments including, for example, healthcare facilities, manufacturing sites and Internet access users. A network permits communication or signal exchange among the various computing systems of the common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system. It is understood by those skilled in the art that a network system may be a distributed configuration with components, administrators and/or users in different locations securely interconnected through the Internet.

The process by which the various computing systems of a network or internetwork communicate is generally regulated by agreed-upon signal exchange standards and protocols embodied in network interface cards or circuitry and software, firmware and microcoded algorithms. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) including especially the IEEE 802 standards and the Internet Engineering Task Force (IETF).

The standards organizations generally focus on the mechanics of network and internetwork operation, less so on mechanisms for managing discrete networks. Access to applications, files, databases, programs, and other capabilities associated with the entirety of a discrete network is regulated based primarily on the identity of the user and/or the network attached function. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication by a management function of the network of the offered attached function identity, the attached function may access network services at a level permitted for that identification and/or the identification of an associated user and the policies and rules of network use established by the network administrators. For purposes of the present description, "network services" include, but are not limited to, network policies, access, Quality of Service (QoS), bandwidth, priority, computer programs, applications, data and databases, files, and network and server control systems that attached functions may use or manipulate for the purpose of conducting the business of the enterprise employing the network as an enterprise asset.

It is well known that events and activities occur that may be harmful to a network system. For purposes of this description, harm to a network system includes, for example, access denial, intentionally tying up network computing resources, intentionally forcing bandwidth availability reduction, and restricting, denying or modifying network-related information. Harm to a network may occur through intentional and unintentional acts. Administrators responsible for minimizing network harm must be constantly vigilant through the network management function. That function may be automatic, manual or a combination of the two. The network management function performs network monitoring, access control and network protection and repair efforts to and through devices of the network infrastructure. Administrators tasked with control of the network management function establish policies and associated rules used to implement those policies and carry out that task by effecting modifications to the operation of one or more devices of the network infrastructure. Those modifications are ordinarily carried out by one or more individuals accessing network management devices such as one or more servers. Access for operational modifications occur at the devices themselves or through remote interaction with the devices.

Typically, the management of one or more networks and/or network services includes specialized network management applications and programs capable of coordinating and tracking the status of many devices, virtual machines, applications, ports and the network links providing the communications capabilities. These management capabilities and applications are relevant to the ongoing operations of the network infrastructure and network system, often requiring secure locations and redundant capabilities. However, the need to protect these resources is directly opposed to the need to provide the data and information contained therein to the individuals with the expertise to use the information to manage and properly operate the network system. Remote notification of events, outages, status changes, and the ability to respond easily and in a timely fashion by one or more experts 24 hours a day is of significant value. In addition, there is in the expanding use of mobile devices and user connectivity included a dramatic increase in "social networking" and the creation of social networking applications and interfaces.

What is needed is an effective arrangement to enable a network administrator to more easily manage a network through remote interactions, particularly via social media applications and interfaces.

SUMMARY OF THE INVENTION

It is an object of the present invention to provide an effective arrangement to enable a network administrator to manage a network through remote interactions. The present invention does so through a system and related method that permits the exchange of information, data and instructions between one or more network administrators and one or more network system devices via one or more social media exchanges. The present invention provides for the management (which includes, but is not limited to, control and monitoring) of one or more of the devices of the network infrastructure through social media. That management may be accomplished through either or both of one or more attached functions and one or more devices of the network infrastructure. This management is accomplished through a social media agent. For purposes of this invention, a social medium is any internet-based system that enables the exchange by a plurality of parties of information, including textual, graphical, pictorial and video information. Two well known examples of social media are Facebook® and Twitter®. The present invention uses these and any other social media capable of enabling the exchange of information between and among parties. The social media agent of the present invention integrates the information exchange mechanisms of social media with network management functions to enable the management of a network through at least one social medium.

The present invention is also advantageous through configuration of the social media agent to maintain "context" in an exchange between a network system device and a network device manager through a social medium. For purposes of the present invention, context means the format of an entire exchange session that complies with the message form available through the social medium and the instruction(s) form required for devices of the network system. The maintenance of context is established for a session and can include all the complexity of tracking the devices, commands, social media and other network interfaces, translations, and portions of the task constituting the pieces to complete the entire management task. It is also established for a plurality of social media and one or more network infrastructure devices. The social media agent of the present invention maintains context when there is one manager with authority to exchange messages with a network device or there is a plurality of managers with authority to exchange messages with the same and/or different network devices or whenever a task is any more complex than a simple message translation and forwarding process.

One concern that arises with the use of social media for the monitoring and management of network systems is the idea that any of the abilities or communications may not be totally secure or at least as secure as existing approaches. The social media agent of the present invention provides for several security mechanisms. The first is the ability to communicate over secure channels, such as https, or SSL. The social media agent may be configured to report results only to social media channels that support secure messaging. The second mechanism used is multi-factor authentication. This can be accomplished several ways but the most obvious is to configure a user with an SMS number to which the social media agent sends a numeric code to, such as a personal identification number. This code can be used for session time that may be of a selectable length or with any command that requires multi-factor authentication. Codes may be single use, multiple use or timed out. Any alternate path or access mechanism (media) established by the social media agent user profile may be used to provide the authentication code. Other multi-factor authentications can be configured per user, or per command. As is known in the art, challenge questions and other mechanism may be used. The challenge may be a simple answer to a question from the user profile or the challenge process may involve several steps requiring proof of a human in command of the user interface or other authentication steps known to those skilled in the art. The social media agent, through the session agent described herein, may be configured so that failure to use secure links and multifactor authentication may disable the command, the session or the user.

Reliability is also considered part of security and the social media agent supports the concept of primary, secondary, tertiary communication methods to ensure the user is reached. The social media agent can require an alert to be acknowledged via a reply to the notification. If the alert is not acknowledged on the primary method, the second, then third and subsequent attempts may be tried. Critical commands can be configured to use all methods. Further, timeout on any response to notifications can lead to notification escalation.

The social media agent is configured to enable a manager to create particular commands that are, in effect, shorthand versions of commands or commands sets, or command scripts used to manage network devices but doing so through the messaging limitations associated with social media. The present social media agent is also configured to select best or alternative options for the social medium or media best suited to enable the transmission of particular information or commands and to further enable alternative message configurations best suited for a particular social media interface. For example, a message of greater than 140 characters may be required to effect a network device change. In that situation, a social medium other than Twitter could be selected to transmit the message or the message could be reformatted in some way to supply the data within the limits of the medium, a shorthand translation being one example. In another example, Twitter may be the most effective tool for transmitting a message from a device to a network manager. In that situation, a particular message form having fewer than 140 characters may be selected to transmit the information via Twitter.

The present invention is a social media agent for exchanging messages with one or more devices of a network system executable on one or more computer devices. The agent includes a social media interface function configured for transmitting and receiving messages through one or more media, wherein at least one of the media is a social medium and wherein each of the one or more social media has a specific message configuration, a network management interface function configured for transmitting and receiving messages with the one or more devices of the network system and a session agent in communication with the social media interface function and the network management interface function, wherein the session agent is configured for translating messages in a communication session of the one or more media into messages recognizable to the one or more devices of the network system and vice versa while maintaining context of the communication session. The session agent is further configured for translating messages of the network system to be compatible with the message configuration of one of the one or more media while also translating at least a portion of the messages of the network system to be compatible with one or more other message configurations of one or more other ones of the media. The session agent is configured for managing a plurality of message exchange sessions. The session agent includes one or more session context components, wherein each session context component is configured for establishing and maintaining one of the plurality of message exchange sessions. The session agent is configured for enabling the exchange of messages between one or more users and the one or more devices of the network system.

The session agent is further configured for enabling the polling and/or monitoring of one or more of the one or more devices of the network system. The session agent is further configured for creating and sending messages to at least one user through one or more of the media based on events deemed relevant to the network system. The events are based on the polling or monitoring of one or more of the one or more devices of the network system. The events are based on messages received through one or more of the media and/or the network management interface function. The session agent is further configured for creating and sending messages to at least one user through the network management interface function. The session agent is further configured for requiring a confirmation of a message exchange through one or more of the media before creating and sending any additional messages through one or more of the media and the network management interface function. The session agent is configured for setting one or more restrictions on message transmittal and implementation when there are a plurality of users exchanging messages with one or more of the one or more devices of the network system. One of the one or more restrictions may be a limitation based on hierarchy and/or based on proxy access through a network management tool, such as a proxy server, for example, configured to direct and receive network device instructions and information.

The session agent is configured for establishing restrictions on use of one or more of the media for exchanging messages based on security of the message configurations and/or security settings for users of the media. The session agent is configured for maintaining context between the one or more devices of the network system and a plurality of media. The session agent is configured for selecting a particular one of the media for message exchange as a function of one or more of the message content, message configuration and the one or more devices of the network system involved in the exchange. The session agent is also configured for enabling formation of shorthand commands associated with the one or more media that can change status, settings and/or parameters of one or more devices of the network system. The session agent is configured for enabling selection of one or more of the media for message exchange based on one or more criteria that may be defined and modified by a network system infrastructure administrator. The session agent is configured for enforcing the use of one or more authentication steps to enable the exchange of messages through any one or more of the one or more media. The number of authentication steps may be a plurality of steps. At least two of the plurality of authentication steps comprise two-way authentication. At least one of the plurality of authentication steps may include a challenge process. The challenge process may involve the presentation of a challenge question requiring an answer from a user wherein the user is the only one who should know the answer to the question. Alternatively, the challenge process may include the use of a depiction of a verification code that must be typed in by a user. For example, something such as the CAPTCHA mechanism generally available that aids a provider of a program or system in determining whether a human, computer or automated program ("bot") from accessing a program for something other than its intended purpose. The session agent is also configured for enforcing the use of one or more authentication steps any selectable one or more communication sessions. Any one or more of the functions of the agent may be established in one or more virtual devices. At least one of the one or more virtual devices may be embodied in a cloud computing configuration. More generally, any one or more of the functions of the agent may be established in a cloud computing environment.

The present invention is also a method for exchanging messages with one or more devices of a network system involving the execution of executable instructions on one or more computer devices. The method includes the steps of transmitting and receiving messages through one or more media, wherein at least one of the media is a social medium and wherein each of the one or more media has a specific message configuration, transmitting and receiving messages with the one or more devices of the network system and translating messages in a communication session of the one or more media into messages recognizable to the one or more devices of the network system and vice versa while maintaining context of the communication session. The method further includes the step of translating messages of the network system to be compatible with the message configuration of one of the one or more media while also translating at least a portion of the messages of the network system to be compatible with one or more other message configurations of one or more other ones of the media. The method also includes the step of managing a plurality of message exchange sessions. The method includes the steps of individually establishing and maintaining each of the plurality of message exchange sessions.

The method includes the step of enabling the exchange of messages between one or more users and the one or more devices of the network system. It includes the step of polling and/or monitoring one or more of the one or more devices of the network system. The method further includes the step of creating and sending messages to at least one user through one or more of the media based on events deemed relevant to the network system. The events are based on the polling or monitoring of one or more of the one or more devices of the network system and/or based on messages received through one or more of the media and/or the network system. The method includes the step of creating and sending messages to at least one user through the network system. It may also include the step of requiring a confirmation of a message exchange through one or more of the media before creating and sending any additional messages through one or more of the media and the network system.

The method further includes the step of setting one or more restrictions on message transmittal and implementation when there are a plurality of users exchanging messages with one or more of the one or more devices of the network system. The restrictions may include a limitation based on hierarchy and/or based on proxy access through a network management tool, such as a proxy server, for example, configured to direct and receive network device instructions and information. The method includes the step of establishing restrictions on use of one or more of the media for exchanging messages based on security of the message configurations and/or security settings for users of the media. The method includes the step of maintaining context between the one or more devices of the network system and a plurality of media. The method further includes the step of selecting a particular one of the media for message exchange as a function of one or more of the message content, message configuration and the one or more devices of the network system involved in the communication session. The method also includes the step of enabling formation of shorthand commands associated with the one or more media that can change status, settings and/or parameters of one or more devices of the network system. The method includes the step of enabling selection of one or more of the media for message exchange based on criteria that may be established. The method also includes the step of enforcing the use of one or more authentication steps to enable the exchange of messages through any one or more of the one or more media. There may be a plurality of authentication steps. At least two of the authentication steps may be two-way authentication. At least one of the plurality of authentication steps may include a challenge question step. The method includes the step of enforcing the use of one or more authentication steps for any selectable one or more message exchange sessions.

The invention is also a social media agent for exchanging messages with a device of a network system. It is embodied in a computer program executable on one or more computer devices. The social media agent includes a social media interface function for transmitting and receiving messages through one or more media, wherein at least one of the one or more media is a social medium and wherein each of the one or more media has a specific message configuration. The agent also includes a network management interface function for transmitting and receiving messages with at least one device of the network system and a session agent in communication with the social media interface function and the network management interface function, wherein the session agent is configured for translating messages of the one or more media into messages recognizable to the one or more devices of the network system, and wherein the session agent is further configured for translating messages of the network system into a first medium message configuration while at least a portion of the messages is translated into a second medium message configuration. The agent may be further configured for requiring a confirmation of a message exchange through one or more of the media before creating and sending any additional messages through one or more of the media and the network management interface function.

For purposes of describing the present invention, the terms "media" and "medium" refer to any mechanism by which messages may be exchanged between and among participants including, for example, email provided through the Outlook® system supplied by Microsoft and Facebook. Medium or media, for the purpose of describing this invention, does not mean the structure or structures by which electrical signals pass from one location to another, such as a wire or a radio signal, for example. "Social media" and "social medium" in particular are subsets of media and medium and represent those mechanisms commonly recognized as having a primarily social information exchange purpose. Examples of social media include, but are not limited to, Facebook and Twitter.

For purposes of describing this invention, a "user" is any person or entity involved in an exchange of messages through the social media agent. A user that specifically manages the exchange of messages may be referred to as a manager and may be a person or a network system device. A user that specifically determines and establishes policies and rules for use of a network may be referred to as a network administrator.

The present invention is suitable for use in facilitating the resolution of any issues that may be of relevance to the network system. For example, such an issue may be a problem with a device of the network system such that it is not operating in an expected manner. The particular problem may or may not be known. In addition to providing notification through the social media agent of the existence of the problem, the social media agent may be used to facilitate the exchange of messages to initiate, monitor and report on the correction of the problem. The social media agent may be configured to create a "helpdesk" case or case ticket informing one or more applicable users of the need for an activity to be carried out to resolve the problem. For example, a repair vendor may be notified that a service is required. The social media agent generates a "create ticket" command and transmits it to one or more relevant functions. The social media agent may further generate one or more commands to get relevant data (IP address, location, responsible party, status, code level, error code, exact revision, history, for example, but not limited thereto), create an action ticket and logs that information, including the ticket request generation, and further may be configured to generate messages in a selectable form and schedule to coordinate resolution of the problem and appropriate notification of relevant users of the activities to be carried out, their completion and resultant status of the device. This configuration provides an easy mechanism for a user with appropriate authority to approve the activity from a remote location through the social media agent. That is, the social media agent may be used to create, verify and approve a case ticket automatically that it has created. This capability allows for the approval of the action(s) of other users as part of management of the network system.

The social media agent is further arranged to accommodate the use of aliases as part of the messaging capability. For example, there may be, or the social media agent may generate, equivalent instructions, information or the like using different messages, message forms and the like. As one example, there may be three distinct names (messages) for the same "reboot the box command," such as reset X, reboot X and re-boot X. Each name would have the same effect on the device. This may be advantageous in that different people may view or think of command syntax differently. The social media agent can account for those differences by enabling aliases for the same instruction set. Alternately, when command messages are exchanged through different media, they may be easier to effect differently dependent on either or both of the message configuration and the user's way of communicating. This alias option may reduce the activity required by a user to carry out a particular effort, such as rebooting a network device, for example, and can be done from wherever that person is located.

It is also to be noted that the social media agent is configured to account for differences not just in the way that particular individuals generate and understand messages through media, it is also configured to account for differences in human languages. That is, one user may communicate through a medium in English and another user may communicate through a medium (including the same or a different medium) using French. These individuals may proceed with transmittal and reception of messages that they understand that also generates one or more desired activities associated with the network system that are consistent with the same one or more activities that a different user may also want to create, or to understand when they are notified of the activities, regardless of the particular details of the individual-generated message, including the particular human language associated with such messages.

These and other advantages of the present invention will become apparent upon review of the following detailed description, accompanying drawings and appended claims.

BRIEF DESCRIPTION OF THE DRAWINGS

FIG. 9 is a representation of a seventh screen capture of the example social media exchange between the network device and the network administrator.

DETAILED DESCRIPTION OF THE PREFERRED EMBODIMENTS

Figure 1:
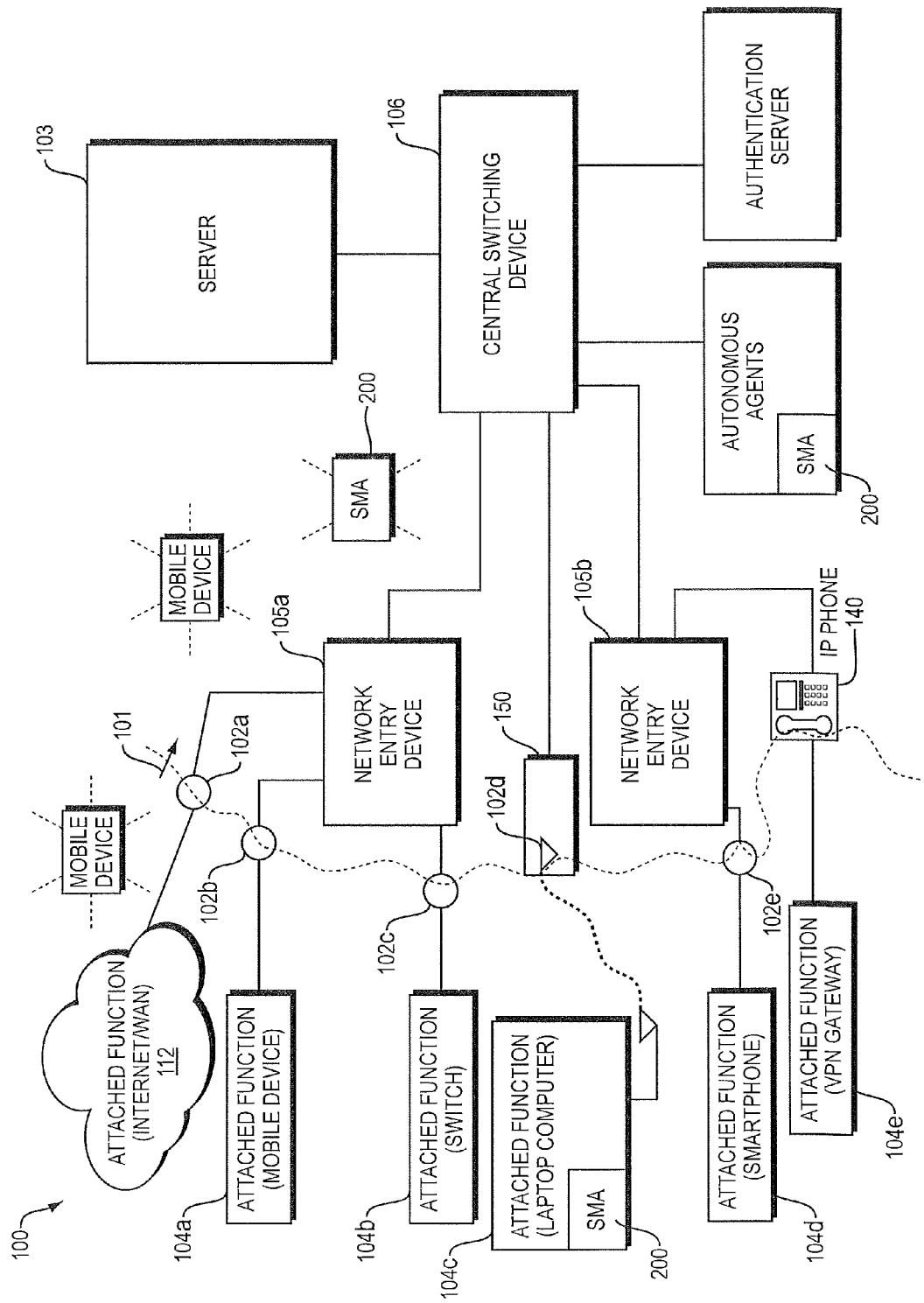
FIG. 1 is a simplified diagrammatic block representation of an example network system with the social media agent of the present invention.

Referring to FIG. 1, a network system 100 including one or more devices of a network infrastructure 101 incorporating and/or using a social media agent 200 to carry out signal exchanges via one or more social media that permit the direct or indirect control of the functioning of one or more devices of the network 100, and/or to gather information about the one or more devices through the social media. A simplified version of the system of the present invention is a typical local (all the functions in a single device) implementation of the social media agent 200 described herein. It is to be noted that the social media agent 200 functionality may be established in whole or in part in one or more devices of the network 100.

The network infrastructure 101 includes multiple switching devices, routing devices, firewalls, access points, MANs, WANs, VPNs, and internet connectivity interconnected to one another and connectable to the attached functions by way of connection points (e.g., 102a-e). As noted, a "network attached function" or an "attached function" may be a user connected to the network infrastructure 101 through a computing device and a network interface device, an attached device connected to the network, a function using the services of or providing services to the network, or an application associated with an attached device. For purposes of describing the system and method of the present invention, a fixed or a mobile device configured to access the network infrastructure, either directly or through the Internet, may be an attached function. An attached function is external to infrastructure 101 and forms part of network system 100. Examples of attached functions 104a-104e are represented in FIG. 1. Network infrastructure entry devices 105a-b of infrastructure 101 are packet forwarding devices as their primary functions and they provide means by which the attached functions connect or attach to the infrastructure 101.

A network entry device can include and/or be associated with wireless connectivity (e.g., wireless access point 150) as well as an Internet Protocol Phone 140, but not limited thereto. For the wireless connection of an attached function to the infrastructure 101, a wireless access point may be used to establish that connection. The wireless AP device shown typically operate via specifications define by the IEEE 802.11a,b,g,n standards and other related standards. It can be an individual device external or internal to a network entry device. A central switching device 106, which also primarily functions as a packet forwarding device, enables the interconnection of a plurality of network entry devices as well as access to network services, including server 103. The central switching device 106 or any other type of signal transfer device, further enables the interconnection of the network infrastructure 101 to attached functions that include WANs (represented by internet cloud 112), VPN gateways (represented by device 104e), as well as firewalls and intrusion detection devices, intrusion response devices and intrusion protection devices are connectable to the attached functions.

One or more of the devices of the network system 100 may be configured to include the social media agent of the present invention. It is to be understood that any one or more of the devices of the network system 100 may be controlled, accessed and/or monitored through the social media agent. Further, any one or more of the devices of the network infrastructure 101 may be configured to function as a device to access, control and/or monitor other devices, including those of the network infrastructure 101, as well as attached functions, including those of the network system 100, through the social media agent 200. Yet further, it is to be noted that the social media agent functionality described herein may be configured on a per device or per port/channel basis. It is to be understood that the present invention may have all devices configured for all functions noted herein, some may have some of the functions, and some may have none of the functions. Devices may be accessed via a proxy function included in the network system 100.

The network system 100 includes, may include, or may form a part of, a cellular or mobile telephony and data system as well. As is well understood by those skilled in the art, at least a portion of such devices may be referred to as "smartphones." A smartphone is any sort of mobile phone that includes standard telephony functionality as well as advanced computing ability and connectivity. Smartphones are, in effect, computing devices (later defined herein), that include a computer processor and memory, and configured to execute executable instructions of computer program applications. It allows the user to run and multitask applications. Smartphones are becoming a device of choice for mobile communication, wherein both verbal and data services are provided. These and other sorts of mobile communications and instruction-execution devices exchange signals through established standards including, but not limited to second (2G), third (3G) and fourth (4G) generation cellular wireless standards, as well as mobile WiMAX, Long Term Evolution (LTE), as well as LTE-Advanced and WirelessMAN-Advanced, provided they have satisfactory data exchange rates. The social media agent 200 of the present invention includes the use of such devices within and/or attached to, networks for which it may be desirable to access, control and/or monitor network devices through social media. It should be noted many smartphones also have IEEE 802.11a,b,g,n (WiFi) capabilities built into them. This allows the smartphone device to access both types of wireless networks and even to participate in both at once and further the device may act as a gate or bridge between the two technologies.

The present invention provides for the management (which includes, but is not limited to, control and monitoring) of one or more of the devices of the network infrastructure 101 through social media. That management may be accomplished through either or both of one or more attached functions and one or more devices of the network infrastructure. This management is accomplished through the social media agent 200: The social media agent 200 and its development, monitoring, implementation, operation and performance may be carried out through one or more devices, including one or more virtual devices, such as computer program embodiments of physical devices such as servers. When a plurality of devices (real, virtual or a combination of the two) for some or all of the functions of the social media agent 200, the devices may be local to one another and in physical contact with one another. They may also be remote from one another. Some or all may be under a common control or not under a common control. As one example, the social media agent 200 may be embodied in, operated or otherwise managed through a cloud computing arrangement as that term is commonly understood. That is, the social media agent 200 may be developed, operated and/or managed through shared resources accessed via the internet or other networked arrangements in the manner of converged infrastructure and/or shared services.

The social media agent 200 and related method may be described in the general context of computer-executable instructions, such as program modules, being executed by a computing device, which may be a personal computer, a laptop computer, a mobile computing device, smartphone, PDA, a mobile communication device configured to execute executable instructions, as well as any of the devices of the network infrastructure 101, but not limited thereto. Generally, program modules include routines, programs, objects, components, data structures, etc. that perform particular tasks or implement particular abstract data types. The present invention may also be practiced in distributed computing environments where tasks are performed by remote processing devices that are linked through a communications network or other data transmission medium. In a distributed computing environment, program function modules and other data may be located in both local and remote computer storage media including memory storage devices.

A computer processor of the computing device and interactive drives, memory storage devices, databases and peripherals may be interconnected through one or more computer system wired or wireless buses. The system buses may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Universal Serial Bus (USB), Video Electronics Standards Association (VESA) local bus, Peripheral Component Interconnect (PCI) bus, and any sort of bus suitable with smartphones and other types of mobile communication and processing devices.

The computing device may include one or more of a variety of computer readable media. Computer readable media can be any available media that can be accessed by the computer processor and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer processor.

The computing device also includes computer storage media in the form of volatile and/or non-volatile memory such as Read Only Memory (ROM) and Random Access memory (RAM). RAM typically contains data and/or program modules that are accessible to and/or operated on by the computer processor. That is, RAM may include application programs, such as the functions of the social media agent of the present invention, and information in the form of data. The computing device may also include other removable/non-removable, volatile/non-volatile computer storage and access media. For example, the computing device may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computing device to perform the functional steps associated with the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor. A user may enter commands and information into the computer processor through input devices such as a keyboard and/or a pointing device, such as, but not limited to, a mouse, a trackball and a touch pad. Other input devices may include a microphone, joystick, touchscreen, satellite dish, scanner, or the like. These and other input devices are connected to the computer processor through the system bus, or other bus structures, such as a parallel port or a universal serial bus (USB), but is not limited thereto. A monitor or other type of display device is also connected to the computer processor through the system bus or other bus arrangement. In addition to the display, the computer processor may be connected to other peripheral output devices, such as printers, for example.

The computer processor may be configured and arranged to perform functions and steps embodied in computer instructions stored and accessed in any one or more of the manners described. The functions and steps, such as the functions and steps of the present invention to be described herein, individually or in combination, may be implemented as a computer program product tangibly as non-transient computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor, instruct the computer processor to perform one or more processes or acts described herein, and/or various examples, variations and combinations thereof. Such instructions may be written in any of a plurality of programming languages, for example, XML, Java, Java ME, Visual Basic, C, or C++, Fortran, Pascal, python, Eiffel, Basic, COBOL, any sort of programming languages for mobile devices such as smartphones, and the like, or any of a variety of combinations thereof. The computer-readable medium on which such instructions are stored may reside on one or more of the components described above and may be distributed across one or more such components.

The social media agent 200 is embodied in one or more computer programs, in the form of software, hardware, firmware or any combination thereof. The functions identified may be carried out through the computer processor as a single computing mechanism, or through a plurality of computer processors. The invention may include one or more databases and may be established in one or more other computer systems in electronic communication with the computer processor. The computer processor/devices embodying the social media agent 200 may be a portion of, entirely of, or not a part of the network infrastructure 101.

Figure 2:
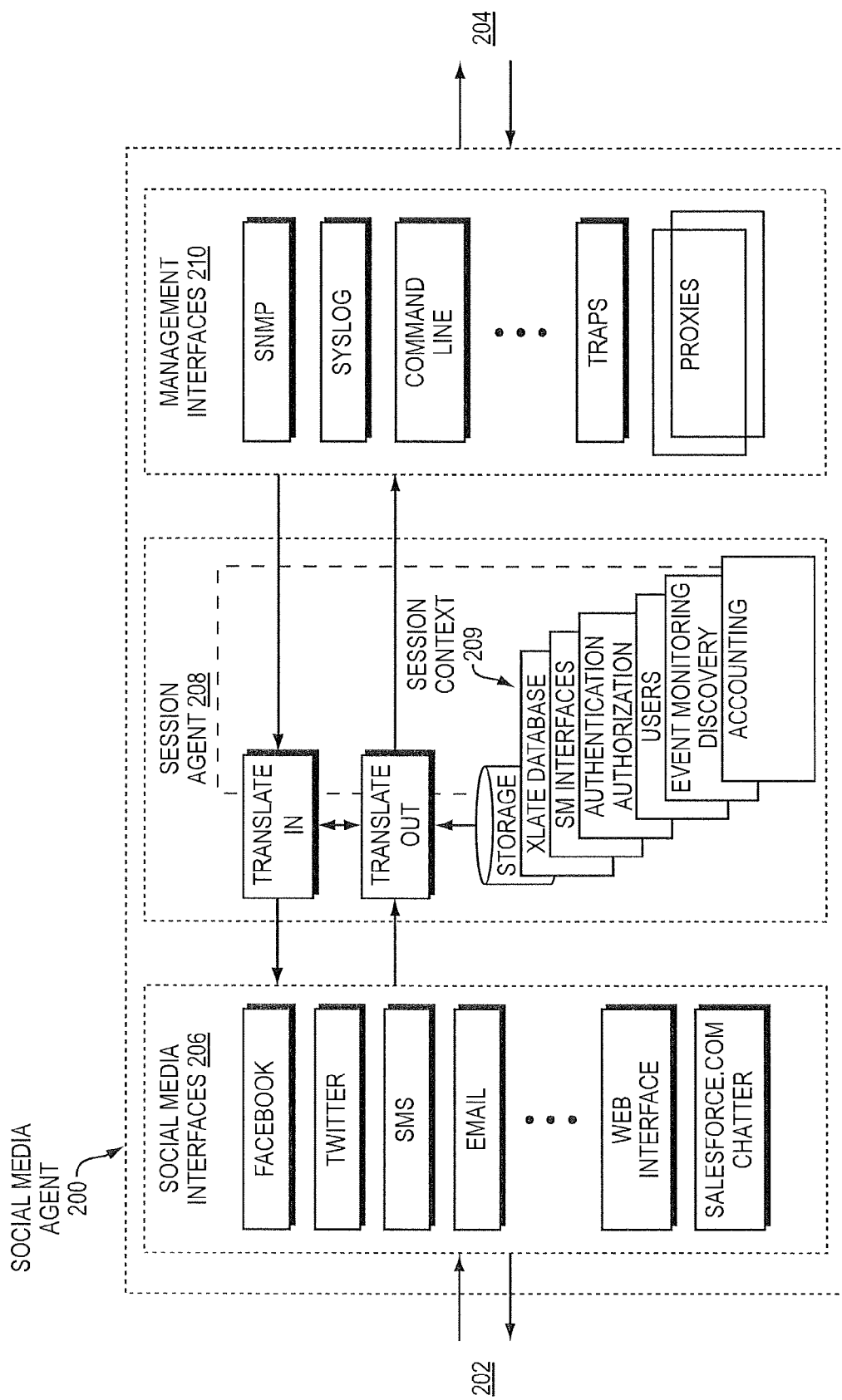
FIG. 2 is a simplified representation of the social media agent of the present invention.

The architecture of the social media agent 200 of the present invention is represented in FIG. 2 and described with respect to an example. It is to be understood that it is not limited thereto. The social media agent 200 enables the configuration of one or more devices of the network infrastructure 101 to perform as an interface to, and to act as, a social network participant. That is, it provides the ability to receive messages from and send messages/queries/commands to one or more devices of the network infrastructure 101 as well as to and from any attached functions. This act of bidirectional "forwarding" messages between devices of the network infrastructure 101 and the social media participants is more complex than a simple packet forwarding device which could be accomplished by a MAC bridge as defined by the IEEE 802.1D or similar standards. The social media agent 200 is shown in FIG. 2 as a 2-ported device, it could, however, operate as a set of computer readable instructions operating in a computer environment executing on a device or set of devices through one or more network ports connected to a computer and/or telecommunication network as noted above. It may also be embodied in a device having more or fewer than two ports and it may either be embodied in a device of the network infrastructure 101 or an attached function of the network system 100.

Diagrammatically in view of FIG. 2, messages are received by the social media agent 200 from a social medium at port 202, operated on and transmitted on to the other side of the architectural diagram to a device through port 204. Messages are passed bi-directionally at ports 202 and 204. The operations performed at the social media agent 200 may cause one or more packets to be sent in reaction to the reception of a single packet or event on either the social media network through port 202 or managed device portion of the network infrastructure 101 through port 204. The operation can be thought of as a direct translation on a packet-in to packet-out basis, but this is not always the case. Many packets may be received in an effort to monitor the network system 100 for events or packets of significance and then one or more packets may be sent in reaction to the packet or event. Events may occur on either interface represented by ports 202 and 204.

The social media agent 200 includes three primary functions, which are a social media interface function 206, a session agent 208 and a management interface function 210. The social media interface function 206 is configured to receive and transmit signals from and to port 202 in a form compatible with the signal exchange protocols associated with any social medium. The session agent 208 is a function configured to convert social media signals into signal protocols compatible with network device management, and to convert network device management signals into signals compatible with social media protocols. The session agent 208 also transfers signal information to a plurality of event storage content files. The management function 210 is configured to transfer translated signals to one or more selectable devices of the network infrastructure 101 through port 204 for analysis, decision making and the like. The management function 210 is also configured to receive signals from one or more devices of the network infrastructure 101 for transfer to the session agent 208.

There are multiple social media sites including, but not limited to, MySpace, orkut, Chatter, Google buzz, and buzznet, as well as the currently popular Facebook and Twitter. It is very likely there will be more and the market will continue to change. A specific interface agent may be designed for each social medium site, but the change in the market would likely make this impractical. There is therefore good reason to make the agent work for multiple media. The social media agent 200 is configured to enable the use of multiple social media based on a single "event" or received message. The social media agent 200 is configured to deal with the particulars of each interface "style" features and limitations. As an agent it "joins" each supported social medium. The interface function 206 is configured to enable the agent 200 to participate fully in any particular medium it joins. Each interface of the interface function 206 may be configured to adapt to the particular human look and feel of each corresponding medium. For example, certain "friends" are allowed and certain groups are joined and active "pings" may be used to know the status and availability of key participates.

With respect to the Twitter medium and its particular interface of the interface function 206, it is to be noted that Twitter has developed an Application Protocol Interface (API) to allow users to access their accounts. The API requires OAuth authentication so the username and password are never sent over the network by the social media interface function 206 of the social media agent 200. Upon creation of a Twitter account, the account must be set to private so no one can publicly view the tweets. Followers must be added to allow others to view the tweets or to send direct messages to others. Twitter limits tweets and direct messages to 140 characters. Due to this limitation, the use of other resources and/or particular interface configurations are required including, but not limited to, tinyurl and/or embedding data in images. Tinyurl is a website that accepts a URL that exceeds the 140 character limitation of Twitter and generates a URL that is approximately 25-30 characters in length. The new tiny URL' will map to the original URL when a user attempts to access it. Since Twitter can be accessed with HTTPS, the social media interface function 206 associated with Twitter can be modified to send tweets, queries, or direct messages over HTTPS for added security. Even though the social media interface 206 is configured to use the highest level of security possible, the end user viewing the tweets, status updates and direct messages should do the same. The social media agent 200 is preferably configured to support the highest level of security. The social media agent 200 is preferably provided to police the interactions, commands and instructions and to prohibit certain interactions which require levels of privacy or security not provided by certain interfaces or communications protocols. Two-way authentication may further be used as is deemed necessary or administratively established for certain user actions, commands or sessions.

With respect to the Facebook medium and its particular interface of the interface function 206, it is to be noted that Facebook has developed an API to allow users to access their accounts. The Facebook API requires OAuth authentication so the username and password are never sent over the network by the social media interface function 206 of the social media agent 200. Upon creation of a Facebook account, the account's privacy settings must be set to "Friends Only." By setting it to "Friends Only", only friends can view status updates. Private messages can be sent with Facebook as well through filters that may be established by a Facebook participant. Facebook status updates can be generated using 420 or more characters in length. The Facebook site supports HTTPS for additional security. The interface function 206 can be modified to send status updates, queries, or private messages over HTTPS for added security. Even though the social media interface has been configured to use the highest level of security possible, the end user viewing the status updates and private messages must also do the same to make the use of this particular social medium more effective for the purpose of the present invention. It is to be noted that the social media agent 200 can be configured to support the highest level of security.

Other social media may be used to perform network device information and management exchanges. Salesforce.com/Chatter (Chatter) is a private enterprise scale Twitter-like service. Improved security and authentication available with Chatter support a more select grouping of participants. Email and Web Services (similar to email) are less purely social media, but they are options as interfaces to resort to, or be pushed to, by the social media agent 200 to conduct some of the business of managing the network that may not be possible using the interfaces with express character type or length limitations. As an example of the possible use of email (and similarly, Web Services) in the message exchange method of the present invention, an alert may be received via Facebook for a status change from my "friend" the wireless Access Point (AP). A status request forces a response via a large email. The email response is read via a standard email interface. A Facebook command is used to reset the device and status updates can be received via Facebook after the reset. This example shows a use of email to escape the file/structure/size limitation of certain social media, as indicated above. In such a situation, for example, a Tweet could merely indicate a "device email" was waiting. A level of urgency could be built into the message within the Twitter messaging framework such as by providing a "score" in the message or repetition of the message to alert the user. Other messaging interfaces may be used with respect to the network device management/information exchange process of the present invention.

With continuing reference to FIG. 2, the session agent 208 resolves limitations and differences among the different social media interfaces in their message exchanges with devices of the network infrastructure 101. Those limitations and differences include character limits, data formats not supported by the specific social media interface, security, the concept of multiple managers; that is, enabling more than one person or attached function to exchange messages, including device management messages, with one or more devices of the network infrastructure 101. Other limitations and/or differences resolved by the session agent 208 include "more data" commands, "presentation of data" features, shorthand notations and special commands as created or needed for syntax length or special characters not allowed or passed by the social media interface.

The session agent 208 may be configured based on user profile data to provide email "escapes" for longer messages and alternate file types; that is, to translate an incoming data set destined for a Twitter interface into an email message or other interface supported by the user. Similarly, web services escapes can be created with context, as defined above, to provide the command line interface for one or more particular network infrastructure devices. The session agent 208 is also capable of being configured to push messages destined for one social media interface to another for security reasons and/or to push to a particular application considered sufficiently or better suited to carry out a particular function.

Social media networks often do not have the ability to make a connection between a request and the response to a request. Linkages of messages or connections make it easier to request additional data because part of the context may be saved. Commands established through the session agent 208 such as "next" rely on the state of a particular device or devices of the network infrastructure and/or state of communications with the device(s) or a connection on a service interface being retained from one command to the next. This command capability embodied in the session agent 208 resolves limitations such as the character limitations of Twitter while facilitating the use of a social media interface of choice and still getting the desired information/management exchange effected.

The session agent 208 is further configured to enable the gathering and retention of information relevant to device messaging events. Information gathered includes, but is not limited to, what users and devices are out there as social media entities? Who is out there for message exchange with the devices? How is contact established between the network device and a social media entity? What social media interface or interfaces are available and to be used for message exchanges? What ports/protocols/status information is available? Can I actively request status information, such as through device status "heartbeat" pings? Other discoveries of interest to the network administrator may be made through the session agent 208.

The session agent 208 is configured to track events from both the social media interface function 206 and the network management interface function 210. It is arranged to identify exchanges that are to be or that have been translated and what is or is not to be shared with other entities including within the network infrastructure 101. It also carries out active monitoring of social media configured network devices to create an event (such as a notification) on status or non-responsive devices/services/interfaces/voice messages. Messages can be generated based on events or any other triggering conditions of interest to the users, including administrators. Events include, but are not limited to, anything that may be relevant to the network system 100, such as harmful activities from attached functions, time and network, network link, network device, attached function and virtual device status changes, as well as cloud computing, storage and networking changes.

The session agent 208 provides for authentication and authorization of users and services. RADIUS authentication is a suitable tool for that purposes, but it is not limited thereto. The authentication/authorization is arranged to define who can perform what capabilities and being sure of the identities of the individuals/entities who can communicate with network devices, including for purposes of network device management. The session agent 208 is configured to establish policies and rules for what exchanges can be done over unsecured messaging protocols and what exchanges can be done over secure protocols. As noted, the session agent 208 is configured to allow for multiple managers to exchange management messages with one or more devices of the network infrastructure 101. That may be regulated as a peer set or arranged in a hierarchy, wherein the messages of certain individuals take priority over the messages of others. Credentials can be shared or provided via proxy.

Further functions of the session agent 208 include, but are not limited to, accounting information retention, such as retaining who did what to which device when and through which interfaces, which may be determined through command logging and other means. In regard to the enablement of authorized messaging via a plurality of network device managers, one mechanism is to enable simple "capture" states for who is controlling the device. The session agent 208 only allows one manager to issue commands to a device until the "capture" state is released. Simple timeouts help solve live-lock conditions for dead/dropped connections or forgetful managers. State may be required for other commands or capabilities such as, for example, escapes to other paths, to allow coordination of each command, and the like.

The session agent 208 is also configured to provide for auto-remediation. Auto-remediation is a specific example in which a routine may execute a series of steps to one or more devices while minimizing manager interaction. A code upgrade may be a known fix for a determined problem. The upgrade may require several steps or may even require other products or software to be upgraded at the same time for compatibility purposes. These multiple steps or a set of multiple steps to several network devices, even different network device types, may all be executed as a set of commands (or scripted solution) with a single trigger command or event that may be generated through a social media message. Even events like triggering a backup to start on multiple systems or rolling server resets to voice message or storage servers may be triggered with a simple command or set of commands through a social media message from an authorized manager.

It is to be noted that the session agent 208 has oversight over all message exchanges associated with the social media agent 200. With respect to individual sessions, session context 209 represents the maintenance of context for individual message sessions. That is, for example, there may be multiple managers interfacing with the social media agent 200 with respect to multiple devices of the network infrastructure 101. Each individual session of each of those exchanges is specifically maintained for context by the session context component. Generally speaking, then, an individual user may initiate a particular session and ordinarily will control when the session ends and this activity occurs through the session context 209. The session agent 208 performs session management across multiple sessions and can regulate sessions. It also manages interface selection, authentication, authorization, event monitoring, translation (including pass through, command interpretation and scripting), as well as accounting (including for each session, each device/entity/user and each interface). It also provides for information storage and a user profile database. Event monitoring can be thought of as a system session (initiated by a user at some point that runs until it is stopped or "fulfills its purpose"). Discovery is a session that runs continuously to locate and determine all the devices and their status (as enabled or populated via the management interface function 210 and/or the interface function 206).

The management interface function 210 is arranged to effect the transfer of information and instructions to one or more network devices of the network infrastructure 101. The management interfaces for the network devices are those commonly used in network device management and polling. They are used to interface to network systems and devices to aid in communications and manageability. Other methods beyond those listed herein may be recognized and used by those of skill in the art of network systems and device management. Those listed are meant to provide examples of capabilities and the type of communications in use or are possible to use for communication to systems and devices but the social media agent 200 is not limited thereto. Syslog events can be directly translated and sent to users authorized to receive certain "events". Filtering and modifying the events may add value to the usability of the syslog content. Standard Simple Network Management Protocol (SNMP) is a standardized and well understood approach to network management that may be used as or as part of the management function 210. It may be the prime query source for data. It is a very well defined structure supported by nearly all network devices. MIBs could be easily compiled into the social media agent 200 or accessed through an SNMP proxy agent. SNMP trap events may be used and translated/encoded/forwarded to the session agent 208. Command Line Interface (CLI) commands and responses can be sent directly to the network devices. Encoding and translation is provided as required through CLIs. CLIs are typical on almost all manageable devices connected to networks. Some coordination may be useful to limit difficulties that may occur when multiple network device managers are permitted to send message instructions. The session agent may force a "lock and release" approach to sessions to guard against multiple managers attempting to perform near simultaneous access and parameter changes.

The management interface function 210 may also direct and receive network device instructions and information via a proxy server. The social media agent 200 can, through a proxy server interface, provide the proxy access capability to access network management systems which may have the data or capabilities to: 1) access devices; 2) distill information; and 3) maintain current contact and reachability information for authorized managers. Examples of suitable proxy servers for this purpose include, but are not limited to, HP Openview, NetSight ASM, IDS management, traditional network management systems, intrusion response systems. wireless switch managers, gateways and firewalls, and server and storage management tools. For many enterprise or highly structured users this may be the only interface they allow. This would help force a coordination and logging of events, queries, commands and responses. Further it would help solve the "multiple managers" problem identified above. As an example, wireless switch managers have added a great deal of value on top of an array wireless access points. Direct wireless access point device management could be disabled in large enterprise configurations. Further, the use of a proxy server of the type indicated could minimize the risk of the risk of duplicating network management value and its place in the hierarchy if it is circumvented through a direct social media agent 200 command translation to a device.

The social media agent 200 may be a component in the alert, status determination and management of devices. As the services provided by the social media agent 200 become regular and expected, some added features and capabilities may useful including, for example, redundancy of the functionality and load sharing across multiple social media agents may increase the certainty of reliable, responsive service.

An example set up and use of the social media agent 200 of the present invention is provided herein with respect to FIGS. 3-9.

Workflow Example:

Network management alerts (Example: SNMP v3, Syslog messages, etc.) from IP-based machines are captured via Syslog server. Once the message is captured the following logic is applied. There are four building blocks to this bi-directional communication path.

Event Monitoring Logic: polling logic to capture events, i.e., Syslog messages

Event/Message Controller: Responsible for notification event parsing and translation used to extract relevant event information (text format) to then encapsulate into the translation function 208

Session Agent 208: Twitter4J is an open source logic that is used to feed text based messages to Twitter using the Twitter API. Using this application, the Syslog message is tweeted to a network administrator. This application can also be used as an interface to connect with other social media applications/sites. The communication workflow is between a human and a network device. The device's notification is converted and tweeted to a follower, such as the administrator using a secured construct. Once the administrator has received the notification, he/she can direct a message and/or tweet an action to the device.

Human sourced twitter message parser/translator via the interface 210 to IP-based device of the network infrastructure 101. The tweet language messages are converted to text-based CLI command (via SSH) or SNMP sets to the network device.

The example contemplates that translating device language to social media messages is enabled and that device users are registered in one or more social media interfaces such as for this example, a Twitter account for an IP-based machine or a Facebook page for a plurality of machines. In addition, monitoring IP machine based devices without preexisting applications on mobile devices and controlling IP machine devices without preexisting applications on mobile devices is the status of the example. Further, the translation of social media formatted messages is made to CLI and/or SNMP languages.

Figure 3:
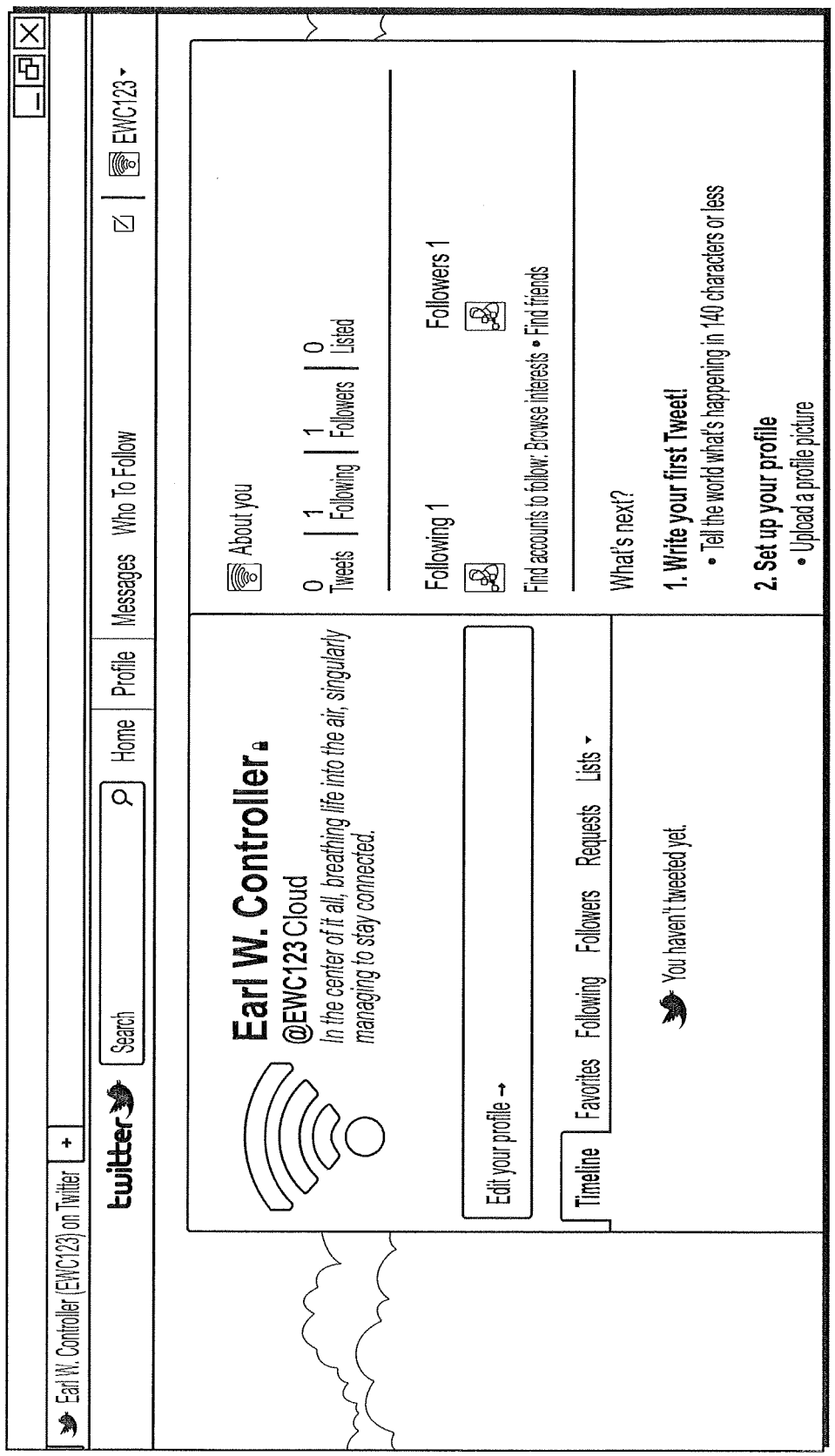
FIG. 3 is a representation of a first screen capture of an example exchange between a network device as a social media entity and a network administrator as a social media entity.
Figure 4:
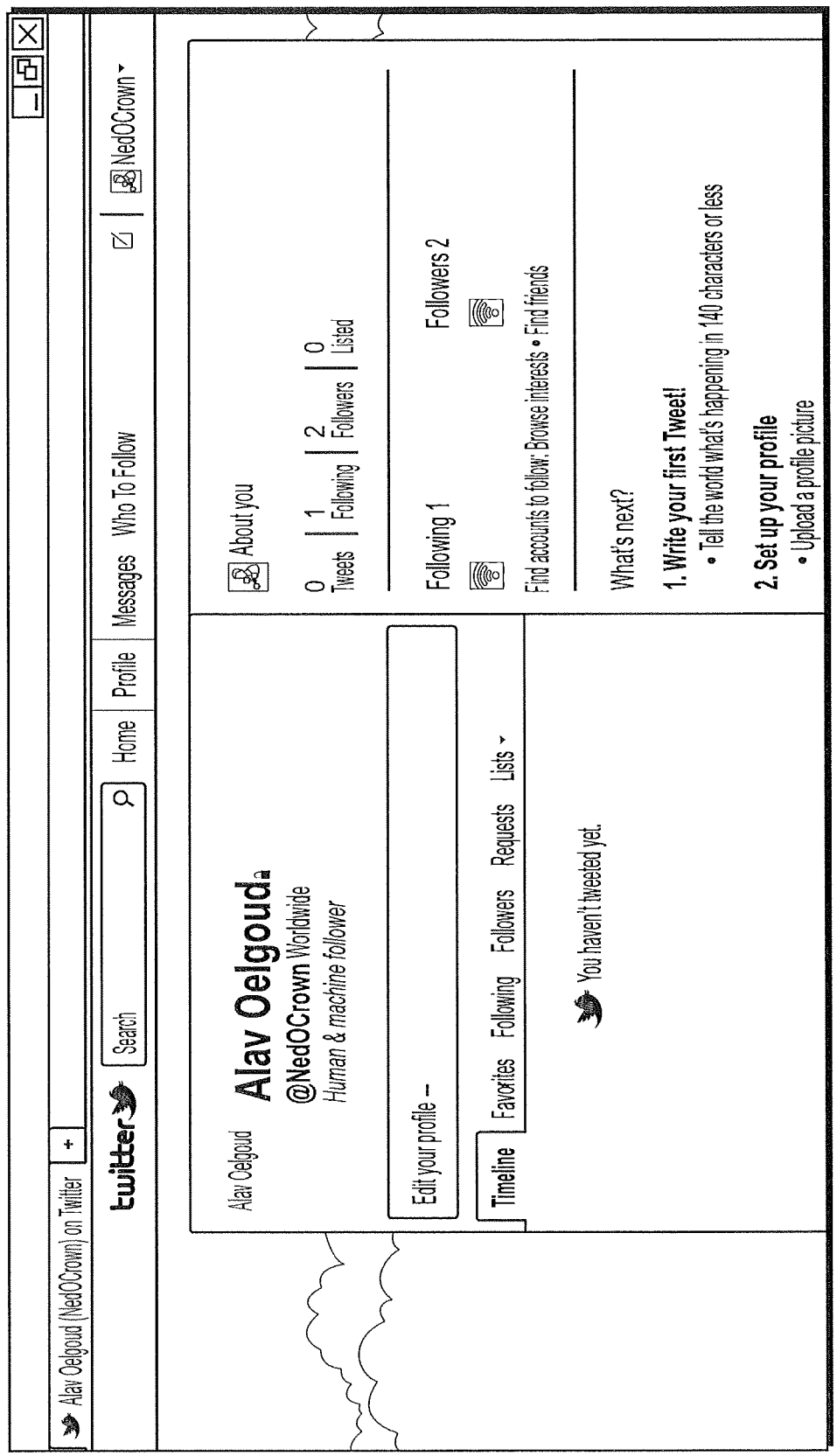
FIG. 4 is a representation of a second screen capture of the example social media exchange between the network device and the network administrator.
Figure 5:
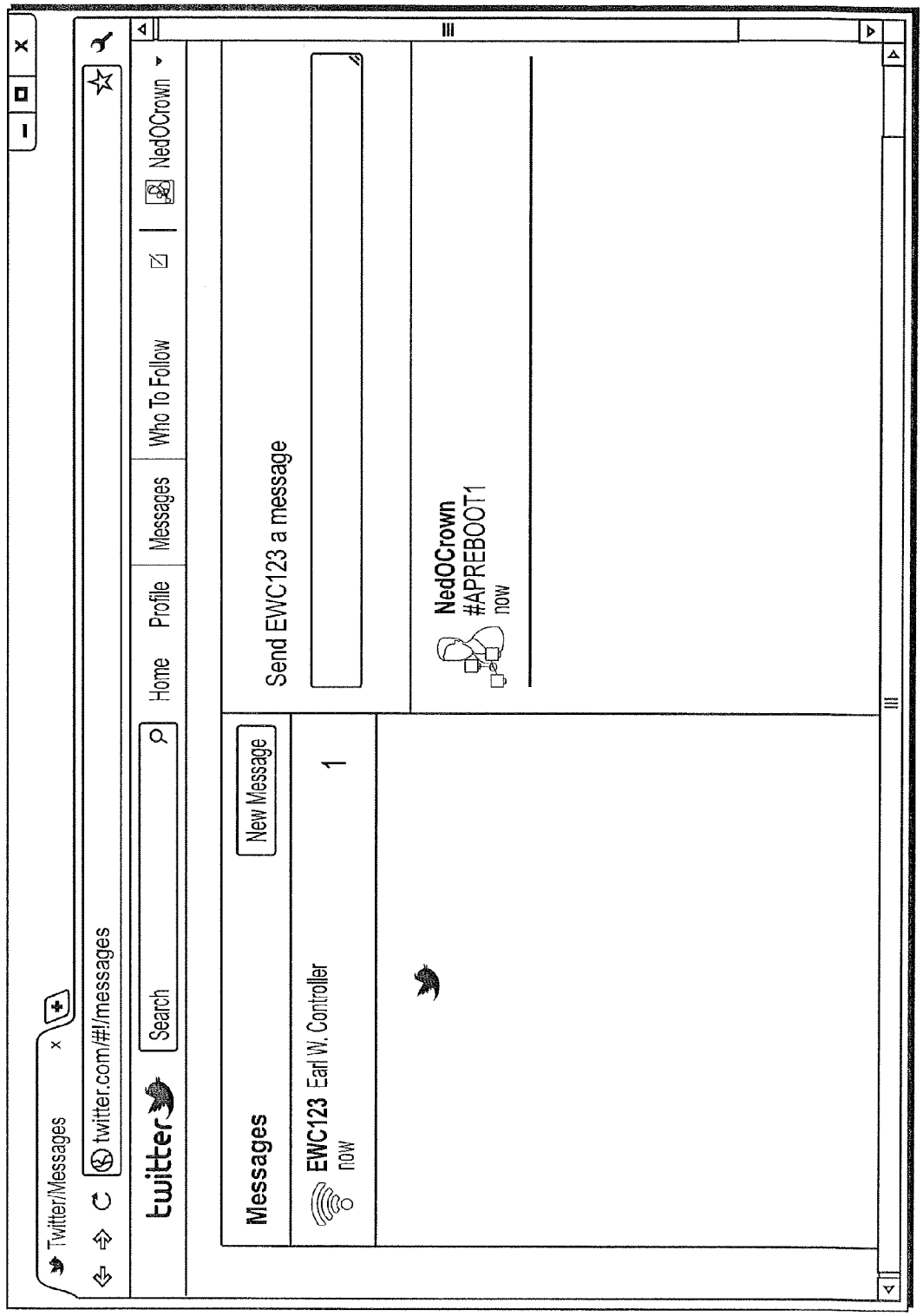
FIG. 5 is a representation of a third screen capture of the example social media exchange between the network device and the network administrator.
Figure 6:
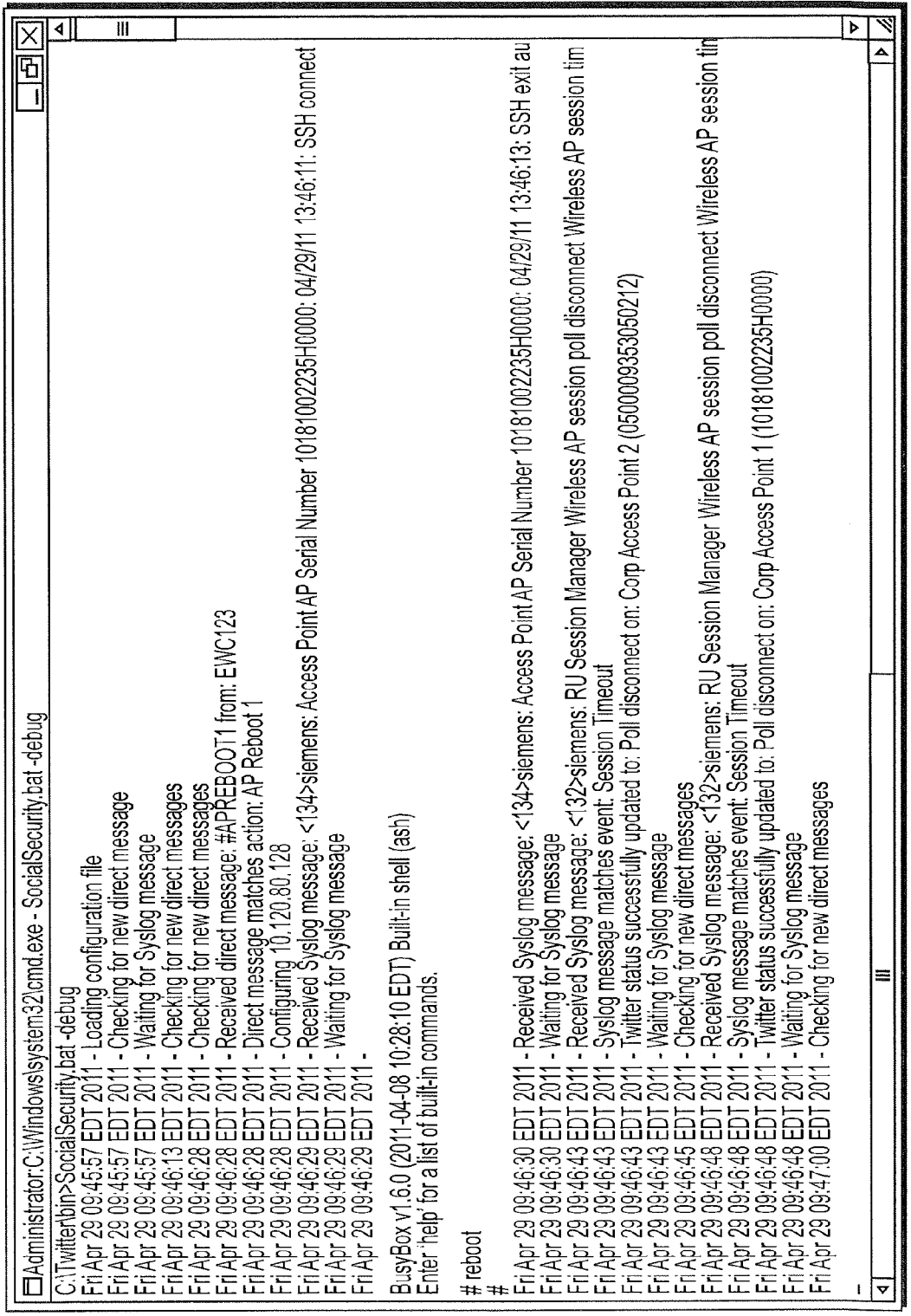
FIG. 6 is a representation of a fourth screen capture of the example social media exchange between the network device and the network administrator.
Figure 7:
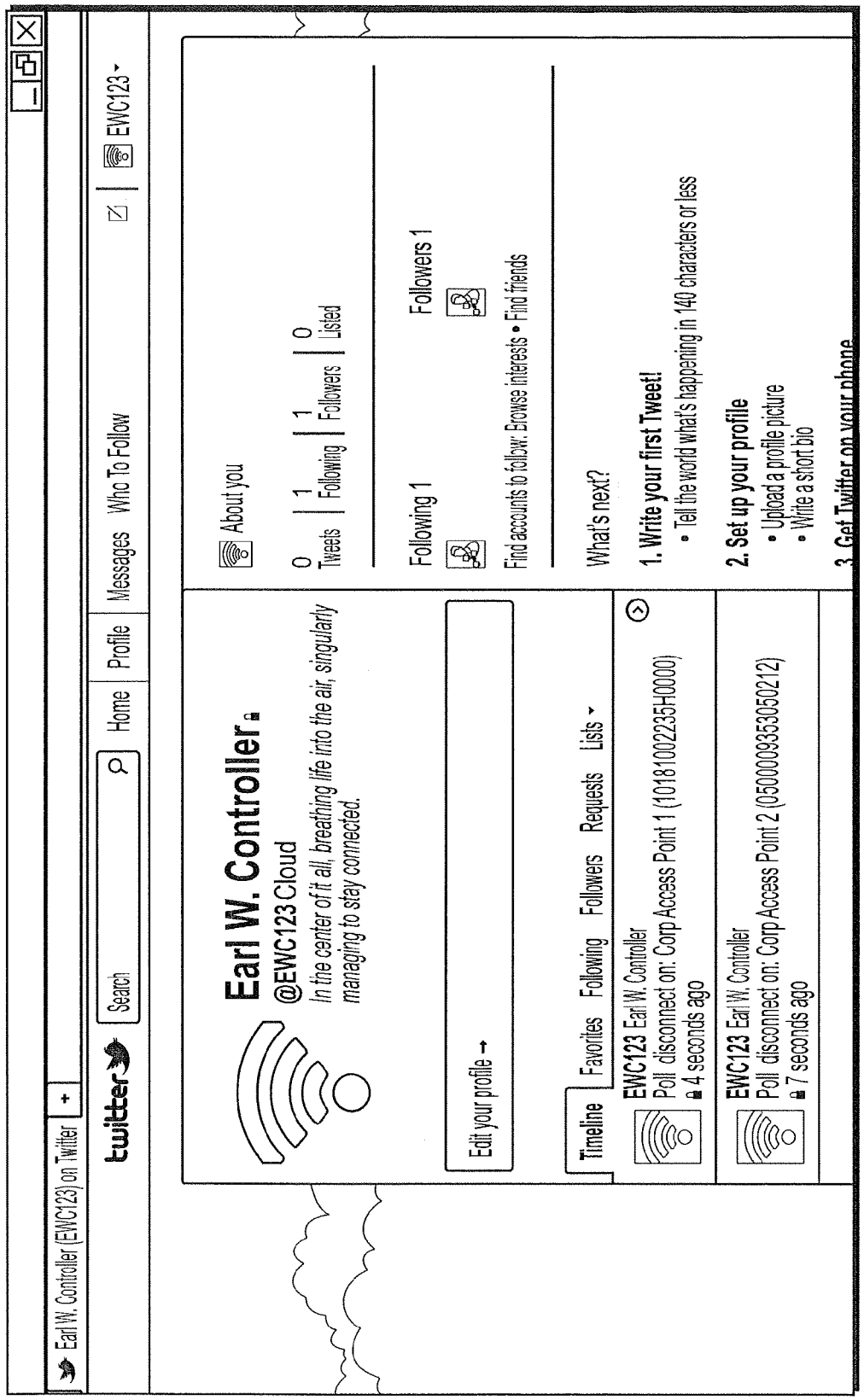
FIG. 7 is a representation of a fifth screen capture of the example social media exchange between the network device and the network administrator.
Figure 8:
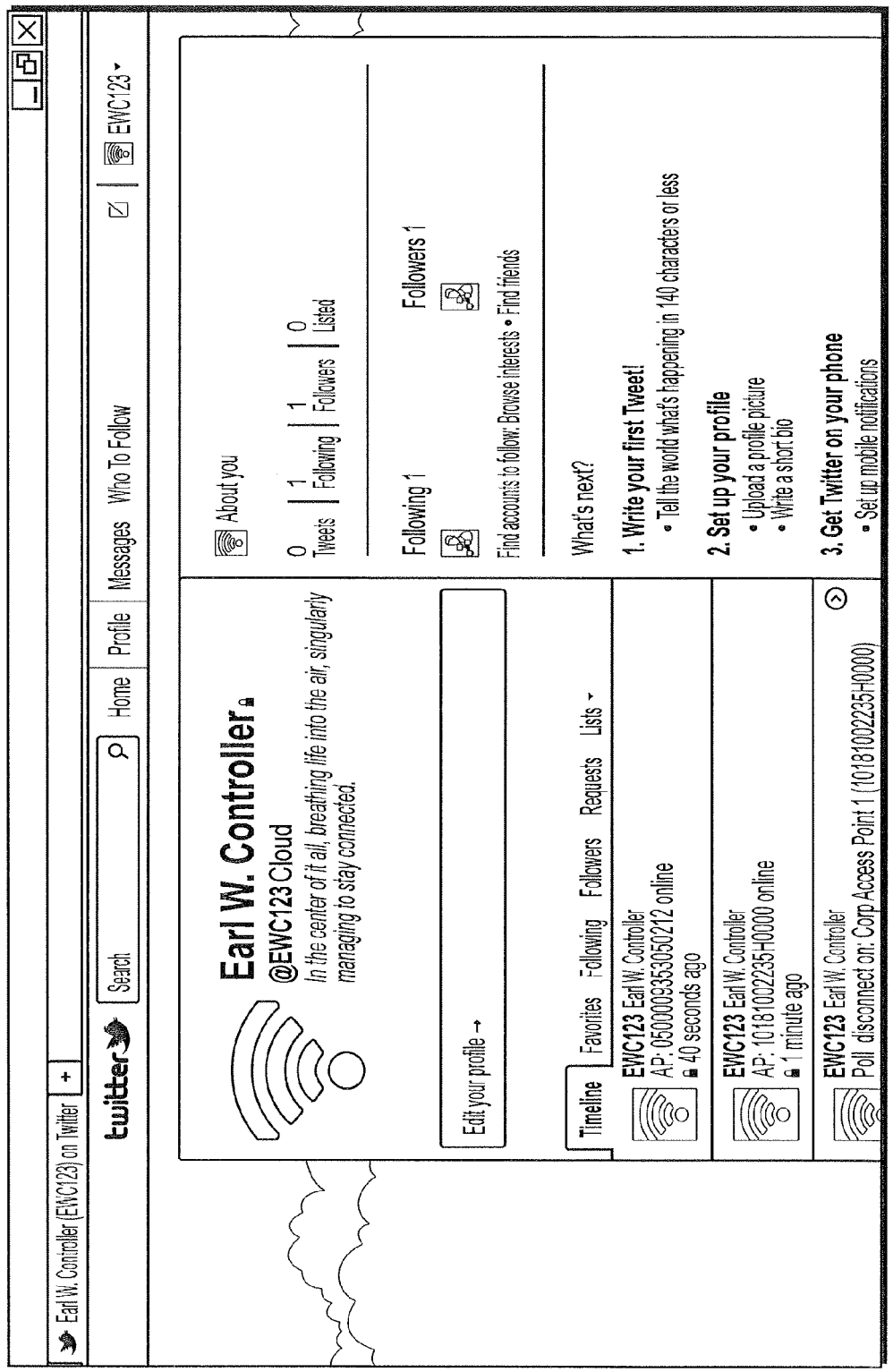
FIG. 8 is a representation of a sixth screen capture of the example social media exchange between the network device and the network administrator.
Figure 9:
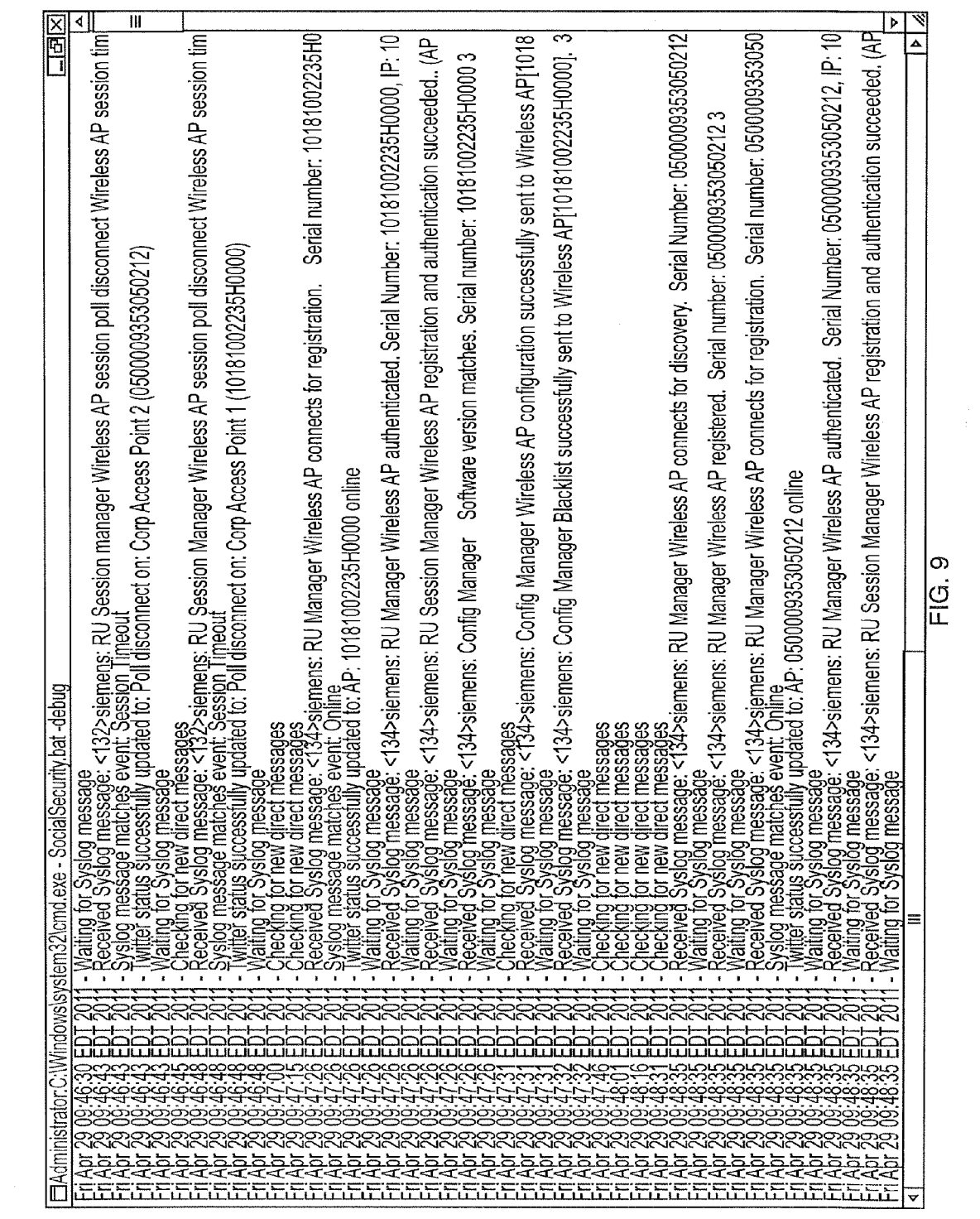

The present example starts with two Twitter accounts (one for the human administrator and one for the network infrastructure device), a wireless access point, a wireless controller (the device with the Twitter account) and a Twitter connection. As shown in FIG. 3, the controller account on Twitter is identified as EWC—Earl W. Controller and the administrator account on Twitter is identified as Ned 0. Crown (see FIG. 4). In FIGS. 3 and 4, no tweets have been generated. The administrator then resets the controller via Twitter. The command is shown in FIG. 5 as: "#APREBOOT1 (this command is generated from an application free utility via Twitter). FIG. 6 shows the wireless access point confirming the reset. The machine reset has caused an event that generates a Syslog message. That Syslog message is then translated to a tweet, shown in FIG. 7. That tweet indicates that the controller is messaging a 'poll disconnect,' which is a device reset. The administrator will see that tweet on a communication device, such as a smartphone, via Twitter. Event monitoring logic recognizes that the wireless AP, which has completed the reset, is back online and that information is transmitted via Twitter as shown in FIG. 8. That exchange is reflected in real time via Syslog messages shown in FIG. 9. Programming associated with the functionality embodied in the representative example exists in the appendix of the priority provisional application incorporated herein by reference.

The social media agent 200 and related method of the present invention enable the remote information exchange and instruction delivery via any one or more social media. Although the invention has been described with respect to a specific embodiment and an example, it is to be understood that all reasonable equivalents are deemed to be within the scope of the invention as established by the following claims.

What is claimed is:

1. A social media agent for exchanging messages with one or more devices of network infrastructure of a network system, the social media agent is a computer program executable on one or more computer devices, wherein the social media agent is established as an executable computer program stored in a non-transitory readable medium on one or more hardware computer devices, the social media agent comprising:

a. a social media interface function configured for transmitting messages to and receiving messages from a port and a session agent, wherein the port is associated with a social medium, and wherein the social medium has a specific message configuration;

b. a network management interface function configured for transmitting commands to and receiving messages from the one or more devices of the network system and receiving commands from and transmitting messages to the session agent; and c. the session agent in communication with the social media interface function and the network management interface function, wherein the session agent is configured for translating messages in a communication session of the port into commands executable by the one or more devices of the network system and vice versa while maintaining context of the communication session in order to manage the one or more devices of the network system through the messages in the communication session, wherein the session agent is configured to receive a message from the port, wherein the port is associated with the social medium having the specific message configuration, and transmit a command, based on the received message, having a signal protocol that is different from the specific message configuration, and wherein the session agent is configured to enable selection of the social medium for use in the communication session of one or more social media based on one or more criteria.

2. The agent of claim 1 wherein the session agent is configured for associating the port with any one or more of the one or more social media and enforcing use of one or more authentication steps to enable exchange of messages through the port to the one or more of the one or more social media.

3. The agent of claim 2 wherein the number of the one or more authentication steps is a plurality of steps.

4. The agent of claim 3 wherein at least one of the plurality of authentication steps includes a challenge process.

5. The agent of claim 4 wherein the challenge process includes a challenge question requiring an answer from a user.

6. The agent of claim 4 wherein the challenge process includes a depiction of a verification code that must be typed in by a user.

7. The agent of claim 3 wherein at least two of the plurality of authentication steps comprise two-way authentication.

8. The agent of claim 2 wherein the session agent is configured for enforcing the use of the one or more authentication steps for any selectable one or more message exchange sessions.

9. The agent of claim 1 wherein the session agent is further configured for creating and sending messages to at least one user through the port based on events relevant to the network system.

10. The agent of claim 9 wherein the events are based on polling or monitoring of one or more of the one or more devices of the network system.

11. The agent of claim 9 wherein the events are based on messages received from the social media interface function or the network management interface function.

12. The agent of claim 1 wherein the session agent is configured for setting one or more restrictions on message transmittal and implementation when there are a plurality of users exchanging messages with one or more of the one or more devices of the network system.

13. The agent of claim 12 wherein one of the one or more restrictions is a limitation based on hierarchy.

14. The agent of claim 12 wherein one of the one or more restrictions is based on proxy access through a proxy server configured to direct and receive network device instructions and information.

15. The agent of claim 1 wherein the session agent is configured for managing a plurality of communication sessions.

16. The agent of claim 15 wherein the session agent includes one or more session context components, wherein each session context component is configured for establishing and maintaining one of the plurality of communication sessions.

17. The agent of claim 1 wherein functions of the agent are established in one or more virtual devices.

18. The agent of claim 17 wherein the one or more virtual devices are embodied in a cloud computing configuration.

19. The agent of claim 1 wherein the session agent is further configured for translating messages of the network system to be compatible with the specific message configuration of the social medium while also translating at least a portion of the messages of the network system to be compatible with a second specific message configuration of a second social medium of the one or more social media.

20. The agent of claim 1 wherein the session agent is configured for enabling exchange of messages between one or more users and the one or more devices of the network system.

21. The agent of claim 1 wherein the session agent is further configured for enabling polling or monitoring of one or more of the one or more devices of the network system.

22. The agent of claim 1 wherein the session agent is further configured for creating and transmitting messages to at least one network user through the one or more devices of the network system using the network management interface function.

23. The agent of claim 1 wherein the session agent is further configured for requiring a confirmation of a message exchange through the port before creating and sending any additional messages through the social media interface function and the network management interface function.

24. The agent of claim 1 wherein the session agent is configured for establishing restrictions on use of the port for exchanging messages based on security of the specific message configuration and/or security settings for users of the social medium.

25. The agent of claim 1 wherein the session agent is configured for maintaining context of a second communication session of the one or more devices of the network system.

26. The agent of claim 1 wherein the session agent is configured to facilitate exchange of messages to initiate, monitor and report on correction of a problem associated with operation of the network system.

27. The agent of claim 1 wherein the network management interface function is configured to, in response to receiving executable commands to perform a function from the session agent, select the function from the group consisting of monitoring or changing status, settings and/or parameters of the one or more devices of the network infrastructure.

28. The agent of claim 1 wherein functions of the agent are established in a cloud computing environment.

29. A method for exchanging messages with one or more devices of network infrastructure of a network system, the method involving carrying out instructions of an executable computer program stored in a non-transitory readable medium on one or more hardware computer devices, the method comprising the steps of:
   a. transmitting messages to and receiving messages from a port and a session agent, wherein the port is associated with a social medium, and wherein the social medium has a specific message configuration;
   b. enabling reception of a message having the specific message configuration from the port and transmittal of a command, based on the received message, having a signal protocol that is different from the specific medium message configuration;
   c. selecting the social medium of one or more of social media for message exchange based on one or more criteria;
   d. transmitting commands and receiving messages using the network management interface function to and from the one or more devices of the network system; and
   e. translating messages in a communication session of the port into commands executable by the one or more devices of the network system and vice versa while maintaining context of the communication session in order to manage the one or more devices of the network system through messages in the communication session.

30. The method of claim 29 further comprising the steps of associating the port with any one or more of the one or more media and enforcing the use of one or more authentication steps to enable the exchange of messages through the port to the one or more of the one or more social media.

31. The method of claim 30 wherein the number of the one or more authentication steps is a plurality of steps.

32. The method of claim 29 further comprising the step of translating messages received from the network system to be compatible with the specific message configuration of the social medium while also translating at least a portion of the messages received from the network system to be compatible with one or more other message configurations of one or more of the one or more of social media.

33. The method of claim 29 further comprising the step of creating and sending messages to at least one user through the port based on events relevant to the network system.

34. The method of claim 29 further comprising the step of requiring a confirmation of a message exchange through the port before creating and sending any additional messages through the social media interface function and the network management interface function.

35. The method of claim 29 further comprising the step of setting one or more restrictions on message transmittal and implementation when there are a plurality of users exchanging messages with the social media interface function using the port to be translated and sent to one or more of the one or more devices of the network system using the network management interface function.

36. The method of claim 29 further comprising the step of establishing restrictions on use of the port for exchanging messages based on security of the message configurations or security settings for users of the social medium.

37. A social media agent for exchanging messages with a device of network infrastructure of a network system, the social media agent is a computer program executable on one or more computer devices, wherein the social media agent is established as an executable computer program stored in a non-transitory readable medium on one or more hardware computer devices, the social media agent comprising:

a. a social media interface function for transmitting messages to and receiving messages from a port and a session agent, wherein the port is associated with a social medium, and wherein the social medium has a specific message configuration;

b. a network management interface function for transmitting commands to and receiving messages from the one or more devices of the network system and transmitting messages to and receiving commands from the session agent; and c. the session agent in communication with the social media interface function and the network management interface function, wherein the session agent is configured for translating messages from the port into commands executable by the one or more devices of the network system, wherein the session agent is further configured for translating messages from the port, wherein the port is associated with the social medium having the specific message configuration, into a command having a first signal protocol while at least a portion of the messages is translated into a command having a second signal protocol in order to manage the one or more devices of the network system through the port, wherein the session agent is configured to enable reception of a message, from the port, having the specific message configuration and transmit a command, based on the received message, having a first signal protocol that is different from the specific message configuration and wherein the session agent is configured for enabling selection of the social medium of one or more social media based on one or more criteria.

38. The agent of claim 37 wherein the session agent is further configured for requiring a confirmation of a message exchange through the port before creating and sending any additional messages through the social media interface function and the network management interface function.

* * * * *